(12) United States Patent
Mujtaba et al.

(10) Patent No.: US 9,763,185 B2
(45) Date of Patent: Sep. 12, 2017

(54) METHODS AND APPARATUS FOR INTELLIGENT RECEIVER OPERATION

(71) Applicant: Apple Inc., Cupertino, CA (US)

(72) Inventors: Syed Aon Mujtaba, Santa Clara, CA (US); Youngjae Kim, San Jose, CA (US); Kee-Bong Song, San Diego, CA (US); Xiaowen Wang, Cupertino, CA (US); Yuchul Kim, San Jose, CA (US)

(73) Assignee: APPLE INC., Cupertino, CA (US)

( * ) Notice: Subject to any disclaimer, the term of this patent is extended or adjusted under 35 U.S.C. 154(b) by 129 days.

(21) Appl. No.: 13/766,055

(22) Filed: Feb. 13, 2013

(65) Prior Publication Data

US 2013/0225094 A1    Aug. 29, 2013

Related U.S. Application Data

(60) Provisional application No. 61/598,263, filed on Feb. 13, 2012, provisional application No. 61/705,562, filed on Sep. 25, 2012.

(51) Int. Cl.
  *H04W 52/02* (2009.01)
  *H04B 7/08* (2006.01)

(52) U.S. Cl.
  CPC ...... *H04W 52/0209* (2013.01); *H04B 7/0871* (2013.01); *H04B 7/0877* (2013.01); *H04W 52/0245* (2013.01); *H04W 52/0238* (2013.01); *Y02B 60/50* (2013.01)

(58) Field of Classification Search
  CPC .. H04B 7/0814; H04B 7/0825; H04B 7/0877; H04B 7/0682; H04B 7/0854; H04B 7/0871; H04W 24/00; H04W 52/42; H04W 52/0209; H04W 52/0245; H04W 52/0238; H04L 1/0001; H04L 1/0015; H04L 1/1861; Y02B 60/50
  USPC .......... 455/63.4, 63.1, 67.11, 562.1; 375/267
  See application file for complete search history.

(56) References Cited

U.S. PATENT DOCUMENTS

| | | |
|---|---|---|
| 6,965,788 B1 | 11/2005 | Barratt et al. |
| 2003/0048861 A1* | 3/2003 | Kung et al. ............ 375/347 |
| 2003/0153358 A1* | 8/2003 | Moon et al. ............ 455/561 |
| 2004/0219959 A1 | 11/2004 | Khayrallah et al. |

(Continued)

FOREIGN PATENT DOCUMENTS

| | | |
|---|---|---|
| CN | 1795687 A | 6/2006 |
| CN | 101755393 A | 6/2010 |

(Continued)

*Primary Examiner* — Lewis West
(74) *Attorney, Agent, or Firm* — Fay Kaplun & Marcin, LLP

(57) ABSTRACT

Methods and apparatus for adaptively adjusting receiver operation for e.g., power optimization. In one embodiment, operation during diversity operation is adaptively adjusted. Diversity techniques consume significantly more power than non-diversity operation. However, the performance gain from receiver diversity is not always predictable. Consequently, in one embodiment, a device evaluates the overall performance gain contributed by diversity operation and, where the performance gain is insignificant or inadequate, the device disables diversity operation. In one implementation, the device can operate in a static single antenna mode, a dynamic single antenna mode and a dynamic multiple antenna mode.

19 Claims, 11 Drawing Sheets

(56) References Cited

U.S. PATENT DOCUMENTS

| | | | |
|---|---|---|---|
| 2004/0253955 A1* | 12/2004 | Love et al. | 455/442 |
| 2007/0042715 A1* | 2/2007 | Salo | H04B 1/1027 455/63.4 |
| 2010/0328155 A1 | 12/2010 | Simic et al. | |
| 2011/0080880 A1* | 4/2011 | Yin et al. | 370/329 |

FOREIGN PATENT DOCUMENTS

| | | |
|---|---|---|
| JP | 2002-111558 | 4/2002 |
| JP | 2009-060364 | 3/2009 |
| KR | 10-2004-0037205 | 5/2004 |
| WO | 03/030403 | 4/2003 |
| WO | 2005/002111 | 1/2005 |
| WO | 2009/021858 | 2/2009 |

* cited by examiner

METHODS AND APPARATUS FOR INTELLIGENT RECEIVER OPERATION

PRIORITY

This application claims priority to U.S. Provisional Patent Applicant Ser. Nos. 61/598,263 filed Feb. 13, 2012 and entitled "METHODS AND APPARATUS FOR INTELLIGENT RECEIVER OPERATION", and 61/705,562 filed on Sep. 25, 2012 and entitled "METHODS AND APPARATUS FOR INTELLIGENT RECEIVER OPERATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless communication, and data networks. More particularly, in exemplary embodiments, methods and apparatus for intelligently adjusting receiver diversity operation based on e.g., diversity performance are disclosed.

2. Description of Related Technology

Within telecommunications, so-called "diversity" techniques use two or more communication channels with different characteristics to transmit and/or receive a signal. Individual channels experience different levels of fading and interference; thus, when the communication channels are sufficiently diverse, the transmitted signal can be recovered, even in the presence of significant noise or other interference.

Unfortunately, in order to receive each communication channel, the transceiver must expend significantly more energy. For example, consider a two-antenna diversity receiver; both antennas, RF (Radio Frequency) and baseband chains must be powered on in order to support diversity operation. Powering two receive chains consumes significantly more power than a single receive chain.

Overall power consumption can have significant impact on user experience for mobile device consumers. Devices which consume less power can operate longer; thus, metrics such as so-called "battery life", "standby time" and "talk time" are critical factors that consumers consider when purchasing new equipment.

Accordingly, improved apparatus and methods for power management and reducing power consumption using diversity operation are needed, especially in the context of high-performance wireless mobile devices with cellular interfaces.

SUMMARY

The present disclosure provides, inter alia, improved apparatus and methods for adaptively adjusting receiver operation during diversity operation.

A method for adaptively adjusting wireless receiver operation during diversity operation is disclosed. In one exemplary embodiment, the method includes: determining if static operation or dynamic diversity operation is necessary based on one or more pre-determined conditions; estimating performance of one or more diversity configurations and one or more corresponding power consumptions; comparing the one or more performance and corresponding one or more power consumptions; and selecting a diversity configuration based on the comparison.

In a second embodiment, the method includes: determining if static operation or dynamic diversity operation is necessary based on one or more pre-determined conditions; determining the performance of one or more diversity configurations and one or more corresponding power consumptions; and selecting a diversity configuration based at least on the foregoing determinations.

A mobile device having power management capability is also disclosed. In one embodiment, the power management capability is achieved through selective use of diversity mode management.

A wireless system is further disclosed. In one embodiment, the system includes at least one base station and at least one wireless mobile device. The mobile device is configured to implement power management through "intelligent" diversity operation.

A computer readable apparatus is additionally disclosed. In one embodiment, the apparatus includes a storage medium having a computer program disposed thereon, the program configured to, when executed, implement diversity mode management for enhanced power consumption behavior on a mobile device.

A method for adaptively adjusting wireless receiver operation during diversity operation is also disclosed. In one exemplary embodiment, the method includes: selecting static operation or dynamic diversity operation based on at least one or more of: (i) a channel quality, and (ii) a resource allocation; and when dynamic diversity operation is selected: estimating performance of one or more diversity configurations and one or more corresponding power consumptions; comparing the one or more performance and corresponding one or more power consumptions; and selecting a diversity configuration based on the comparison.

In one variant, the channel quality consists of at least one of: (i) Channel Quality Indication (CQI), (ii) Signal-to-Noise Ratio (SNR), and (iii) Received Signal Strength Indication (RSSI). In one such variant, a single antenna scheme is selected when the channel quality is above a reception threshold level and the resource allocation is below a utilization threshold level. In a second such variant, dynamic diversity operation is selected when the channel quality is above a reception threshold level and the resource allocation is above a utilization threshold level. In a third such variant, a maximal diversity scheme is selected when the channel quality is below a reception threshold level and the resource allocation is above a utilization threshold level.

In other variants, the estimating further comprises calculating performance of a non-diversity operation and the one or more diversity configurations.

In yet another variant, the one or more power consumptions are directly measured during operation and subsequently stored.

In still other implementations, the performance is measured using one or more of: (i) bit error rates (BER), (ii) block error rates (BLER), and (iii) packet error rates (PER).

In alternate implementations, the performance is estimated based on one or more intermediate calculations selected from at least one of: (i) covariance matrixes, (ii) rake processing, and (iii) diversity weighting ratios.

A mobile apparatus configured to implement dynamic receiver diversity operation is further disclosed. In one embodiment, the apparatus includes: a wireless receiver configured to support both single antenna and diversity antenna reception; a processor in signal communication with the wireless receiver; and logic configured to: determine when static operation or dynamic diversity operation is necessary based on one or more pre-determined conditions; and when dynamic diversity operation is necessary, determine the performance of one or more diversity configuration attributes and one or more corresponding power consumption attributes; and select a diversity configuration based at least on the foregoing determinations.

In one variant, the one or more pre-determined conditions comprises at least a Channel Quality Indication (CQI) and a NodeB scheduling ratio.

In a second variant, the determination of static operation or dynamic diversity operation comprises a link evaluation performed on a periodic basis.

In a third variant, the determination of static operation or dynamic diversity operation comprises a link evaluation triggered by an event.

In a fourth variant, the selection of the diversity configuration is further based at least in part on a comparison between one or more power consumptions associated with the one or more diversity configurations.

A mobile device configured to establish a connection to a target apparatus in a wireless network is also disclosed. In one exemplary embodiment, the device includes: a wireless transceiver, the transceiver configured to: transition between a static single antenna state and a dynamic state based on one or more of: (i) a Channel Quality Indication (CQI) value, and (ii) a scheduled resources value; and transition between a dynamic single antenna state and a dynamic dual antenna state based on one or more of: (i) an antenna gain value, and (ii) the CQI value associated with the dynamic single antenna state; and a processor; and a non-transitory computer-readable storage comprising a plurality of instructions, which when executed by the processor, cause the processor to: reevaluate a need for the transition between the dynamic single antenna state and the dynamic dual antenna state when a predetermined amount of time has lapsed; and estimate a difference in performance between the dynamic single antenna state and the dynamic dual antenna state.

A method of operating a base station in a long term evolution (LTE) cellular wireless communications network is additionally disclosed. In one exemplary embodiment, the method includes: configuring one or more mobile device operable within the LTE network to reduce power consumption associated with diversity operation of a plurality of antennas associated therewith, the configuring causing the one or more mobile device to: switch between a diversity state and non-diversity state; contingent upon entering the diversity state, calculate a performance gain based on a known spatial correlation between the plurality of antennas; compare the performance gain with a predetermined threshold; when the performance gain exceeds the predetermined threshold, enter a dual antenna mode; and when the performance gain does not exceed the tap threshold, enter a single antenna mode.

In one variant, when the spatial correlation is unknown, performance gain is based on calculating a difference between: (i) a calculated CQI value for the dual antenna mode, and (ii) a previously stored and valid CQI value for the single antenna mode.

In a second variant, when the spatial correlation is unknown, performance gain is based on a ratio of equalizer tap energy.

In a third variant, when the spatial correlation is unknown, performance gain is based on calculating a CQI for a single branch.

In a fourth variant, the predetermined threshold comprises a multiple tap criterion.

Other features and advantages disclosed herein will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.

Overview

So-called receiver diversity techniques are widely used within several wireless networking standards (e.g., Universal Mobile Telecommunications System (UMTS), Long Term Evolution (LTE), Wireless Microwave Access (Wi-MAX), etc.) to improve reception performance. During diversity operation, a mobile device such as a user equipment (UE) receives a transmission via two or more distinct communication channels, where each of the distinct communication channels experiences different fading and interference effects. By combining the transmissions from distinct communication channels, diversity operation can compensate for fading and interference effects, which greatly improve device reception.

Unfortunately, diversity techniques consume significantly more power than non-diversity operation. However, the performance gain from receiver diversity is not always predictable. Consequently, in one disclosed embodiment, a device evaluates the overall performance gain contributed by diversity operation and, where the performance gain is insignificant or inadequate, the device disables diversity operation.

In one exemplary embodiment, a receiver device is configured to transition between a static single antenna state and two dynamic states, based on a set of first and second conditions. Specifically, if the mobile device is operating in a high quality channel condition with relatively little utilization then the mobile device can operate in the static single antenna state; otherwise, the mobile device will evaluate several metrics to determine if diversity operation provides sufficient gain to justify its increased power consumption.

Description of Exemplary Embodiments

Exemplary embodiments are now described in detail. While these embodiments are primarily discussed in the context of cellular networks including without limitation, third generation (3G) Universal Mobile Telecommunications System (UMTS) wireless networks, Long Term Evolution (LTE) wireless networks and other fourth generation (4G) or LTE-Advanced (LTE-A) wireless networks, it will be recognized by those of ordinary skill that the present disclosure is not so limited. In fact, the principles described herein are useful in and readily adapted to any wireless network that can benefit from adaptively adjusting receiver operation during diversity operation.

Methods

Figure 1A:
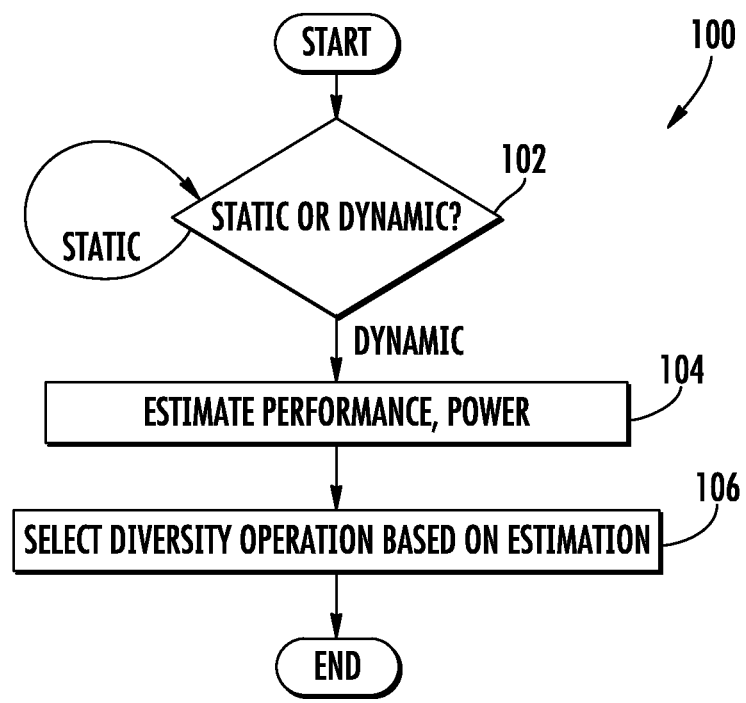
FIG. 1A is a logical flow diagram depicting one embodiment of a generalized method for adaptively adjusting receiver operation during diversity operation.

FIG. 1A illustrates one embodiment of a generalized method 100 for adaptively adjusting receiver operation during diversity operation.

As a brief aside, antenna diversity schemes can be implemented within both receiver and transmitter operations. Generally, diversity operation is categorized as: SISO (Single Input, Single Output), MIMO (Multiple Input, Multiple Output), SIMO (Single Input, Multiple Output), and MISO (Multiple Input, Single Output). Moreover, it is further recognized that where a device has multiple antennas, the device need only enable a subset of antennas. For example, in a device with three (3) antennas, the device may support modes limited to a single antenna, two (2) of the three (3) antennas, or all of the antennas. In fact, incipient device implementations include four (4) or more antennas, and future devices may only further expand antenna diversity schemes (which are also compatible with the principles described hereinafter).

At step 102 of the method 100, the device determines if static operation or dynamic diversity operation is necessary based on one or more pre-determined conditions. In one exemplary embodiment, the device assesses, inter alia, channel condition (e.g., via one or more of Channel Quality Indication (CQI), Signal-to-Noise-Ratio (SNR), Received Signal Strength Indication (RSSI), etc.), and resource allocation (e.g., scheduled data transfers, etc.). Where the device has both a high quality channel (e.g., good CQI), and relatively low resource allocation (e.g., a NodeB scheduling ratio), the device does not require the additional performance gains of receiver diversity, thus the device can operate statically in a single receive antenna mode.

More generally, it is appreciated that certain conditions provide a clear rationale for a specific diversity operation. For example, where the radio environment is of good quality and the data rates are relatively low, then diversity operation will not provide enough improvement in performance to justify the increased power consumption. In other examples, where the radio environment is of good quality and the data rates are very high, then a maximal diversity scheme available can be used. It is further appreciated by those of ordinary skill in the related arts that one or more considerations may be based on customer preferences. For example, a customer may prefer to optimize for higher performance, or alternately better power consumption.

In one exemplary embodiment, the foregoing determination is performed as part of a regular link evaluation. In some variants, the link evaluation may be performed on a periodic basis. In other common embodiments, link evaluation may be performed on an aperiodic basis; common examples of aperiodic schemes include, without limitation: opportunistically, event triggered, user triggered, application triggered, etc.

Referring back to step 102, if the device concludes that static operation is acceptable, then the device configures itself for static operation and the method 100 ends (or alternately returns to step 102 until the next link evaluation). If the device concludes that dynamic diversity operation is necessary, then the device proceeds to step 104 of the method 100.

At step 104 of the method 100, the device estimates performance of one or more diversity configurations and a corresponding power consumption. In one exemplary embodiment, the device calculates performance of non-diversity operation (single receive and/or transmit), and diversity operation. In other embodiments, the comparison may be between various diversity configurations (e.g., two of three communication channels versus three of three communication channels, etc.).

In one variant, power consumption is estimated for each diversity configuration. For example, power consumption for each diversity configuration can be determined ahead of time (e.g., via manufacturing test, rough estimation, etc.). Alternately, power consumption can be directly measured during operation, and used for analysis and/or stored for future reference.

Performance may further be estimated based on measured error rates. Common examples of measured error rates include for example: bit error rates (BER), block error rates (BLER), packet error rates (PER), etc. In certain embodiments, performance is estimated based on intermediate calculations. Common examples of intermediate calculations may include for example, covariance matrixes, intermediate results from e.g., rake processing, diversity weighting ratios, etc.

At step 106 of the method 100, the device selects a diversity configuration based on the estimation. This selection in the exemplary embodiment evaluates one or more performance and/or power consumption-related attributes of the available diversity configurations. This evaluation may include a mathematical comparison or evaluation (e.g., applying one or more mathematical functions to the attributes so as to make an "intelligent" selection of the diversity configuration so as to optimize power consumption.

As shown, the method 100 terminates at the conclusion of step 106, however it is appreciated that various embodiments may return to step 102 so as to operate in a repeating loop. Still other embodiments may determine if a repeating step is desired or if the process may appropriately end.

Figure 1B:
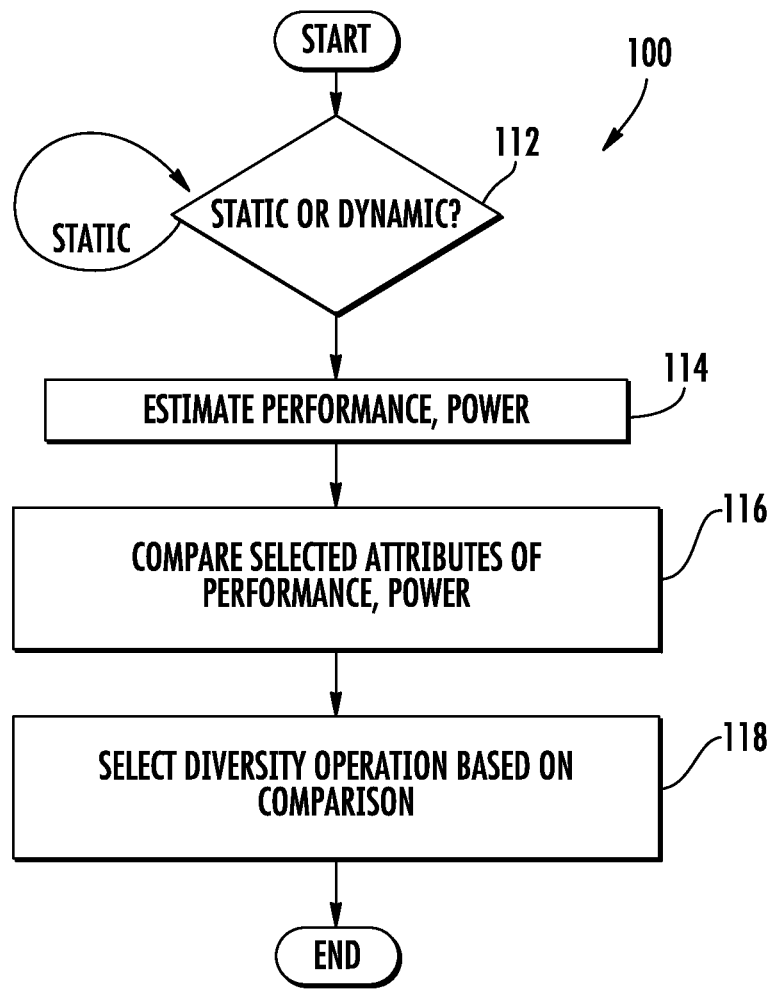
FIG. 1B is a logical flow diagram depicting a second embodiment of a generalized method for adaptively adjusting receiver operation during diversity operation.

FIG. 1B illustrates another embodiment of a generalized method 100 for adaptively adjusting receiver operation during diversity operation.

At step 112 of the method 110, the device determines if static operation or dynamic diversity operation is necessary based on one or more pre-determined conditions. As above, in one exemplary embodiment, the device assesses, inter alia, channel condition (e.g., Channel Quality Indication (CQI), Signal-to-Noise-Ratio (SNR), Received Signal Strength Indication (RSSI), etc.), and resource allocation (e.g., scheduled data transfers, etc.). Where the device has both a high quality channel (e.g., good CQI), and relatively low resource allocation (e.g., a NodeB scheduling ratio), the device does not require the additional performance gains of receiver diversity, thus the device can operate statically in a single receive antenna mode.

As above, the foregoing determination may be performed as part of a regular link evaluation. In some variants, the link evaluation may be performed on a periodic basis. In other embodiments, link evaluation may be performed on an aperiodic basis; common examples of aperiodic schemes include, without limitation: opportunistically, event triggered, user triggered, application triggered, etc.

Referring back to step 112, if the device concludes that static operation is acceptable, then the device configures itself for static operation and the method 110 ends (or alternately returns to step 112 until the next link evaluation). If the device concludes that dynamic diversity operation is necessary, then the device proceeds to step 114 of the method 110.

At step 114 of the method 110, the device estimates performance of one or more diversity configurations and a corresponding power consumption. In one exemplary embodiment, the device calculates performance of non-diversity operation (single receive and/or transmit), and diversity operation. In other embodiments, the comparison may be between various diversity configurations (e.g., two of three communication channels versus three of three communication channels, etc.).

In one variant of the method of FIG. 1B, power consumption is estimated for each diversity configuration. For example, power consumption for each diversity configuration can be determined ahead of time (e.g., via manufacturing test, rough estimation, etc.). Alternately, power consumption can be directly measured during operation, and used for analysis and/or stored for future reference.

As previously noted, performance can also be estimated based on measured error rates such e.g., as bit error rates (BER), block error rates (BLER), packet error rates (PER), etc. In certain embodiments, performance is estimated based on intermediate calculations such as e.g., covariance matrixes, intermediate results from e.g., rake processing, diversity weighting ratios, etc.

At step 116 of the method 110, the device compares the performance and power consumptions of the available diversity configurations. In one exemplary embodiment, the comparison comprises comparing a first Channel Quality Indication (CQI) of a first diversity configuration with a second CQI corresponding to a second diversity configuration.

In one embodiment, the comparison comprises a mathematical difference between the performances. Alternately, in other embodiments, the comparison comprises a ratio. In still other embodiments, the comparison may be a weighted analysis of the various diversity configurations, where weights are ascribed to various parameters based on importance e.g., power consumption, performance, switching hysteresis, processor burden, etc.

At step 118 of the method 110, the device selects a diversity configuration based on the comparison. In certain embodiments, the device may continue to execute, repeating the procedure to continuously monitor and adapt to various diversity conditions.

Example Operation

In the following discussion, an exemplary cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected to a Core Network, which includes additional controllers for resource management and in some cases access to other network systems (such as the Internet, other cellular networks, etc.).

Figure 2:
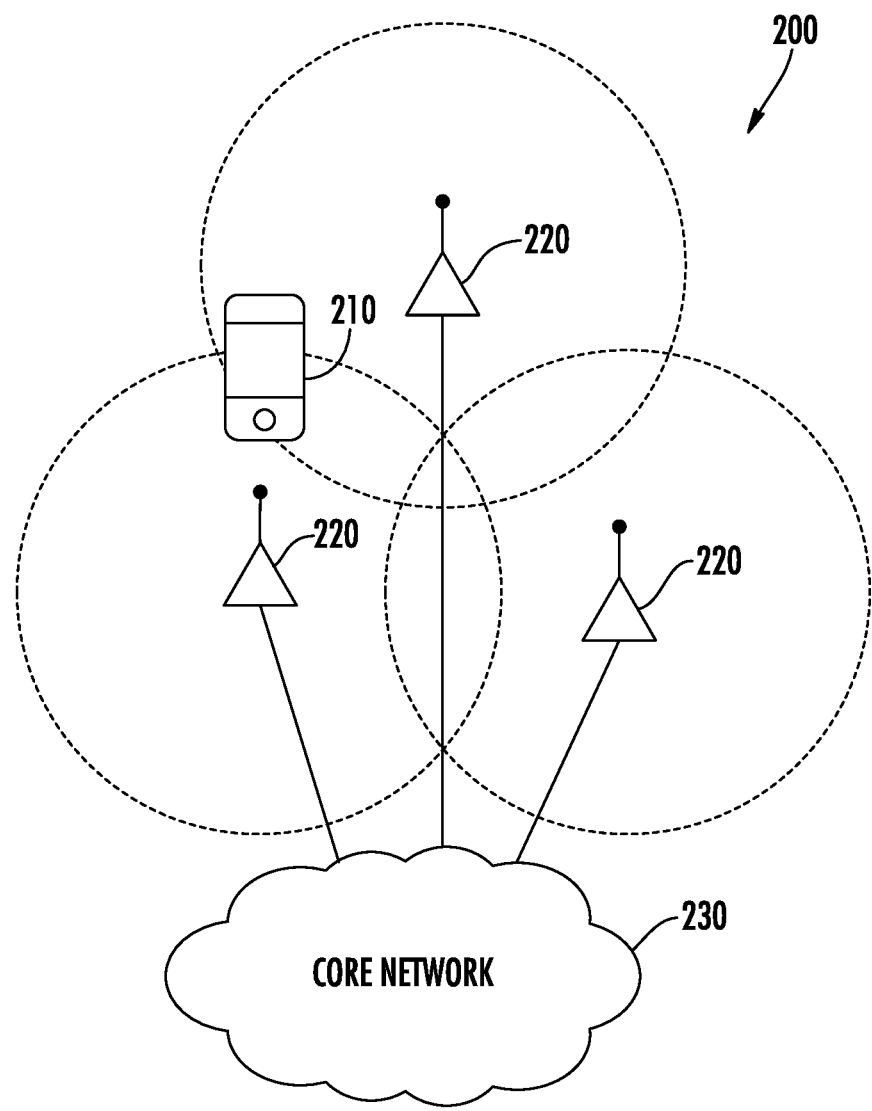
FIG. 2 is a logical block diagram illustrating one exemplary Long Term Evolution (LIE) cellular network useful with various disclosed embodiments.

FIG. 2 illustrates one exemplary Long Term Evolution (LTE) cellular network 200, with user equipment (UEs) 210, operating within the coverage of the Radio Access Network (RAN) provided by a number of base stations (BSs) 220. The LTE base stations are commonly referred to as "Evolved NodeBs" (eNBs). The Radio Access Network (RAN) is the collective body of eNBs along with interfaces to other network elements such as mobility management entities (MME) and serving gateways (S-GW). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone™ manufactured by the Assignee hereof), personal computers (PCs) and mini-computers, whether desktop, laptop, or otherwise, as well as mobile devices such as handheld computers, PDAs, personal media devices (PMDs), or any combinations of the foregoing.

Each of the eNBs 220 are directly coupled to the Core Network 230 e.g., via broadband access. Additionally, in some networks the eNBs may coordinate with one another, via secondary access. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

Figure 3:
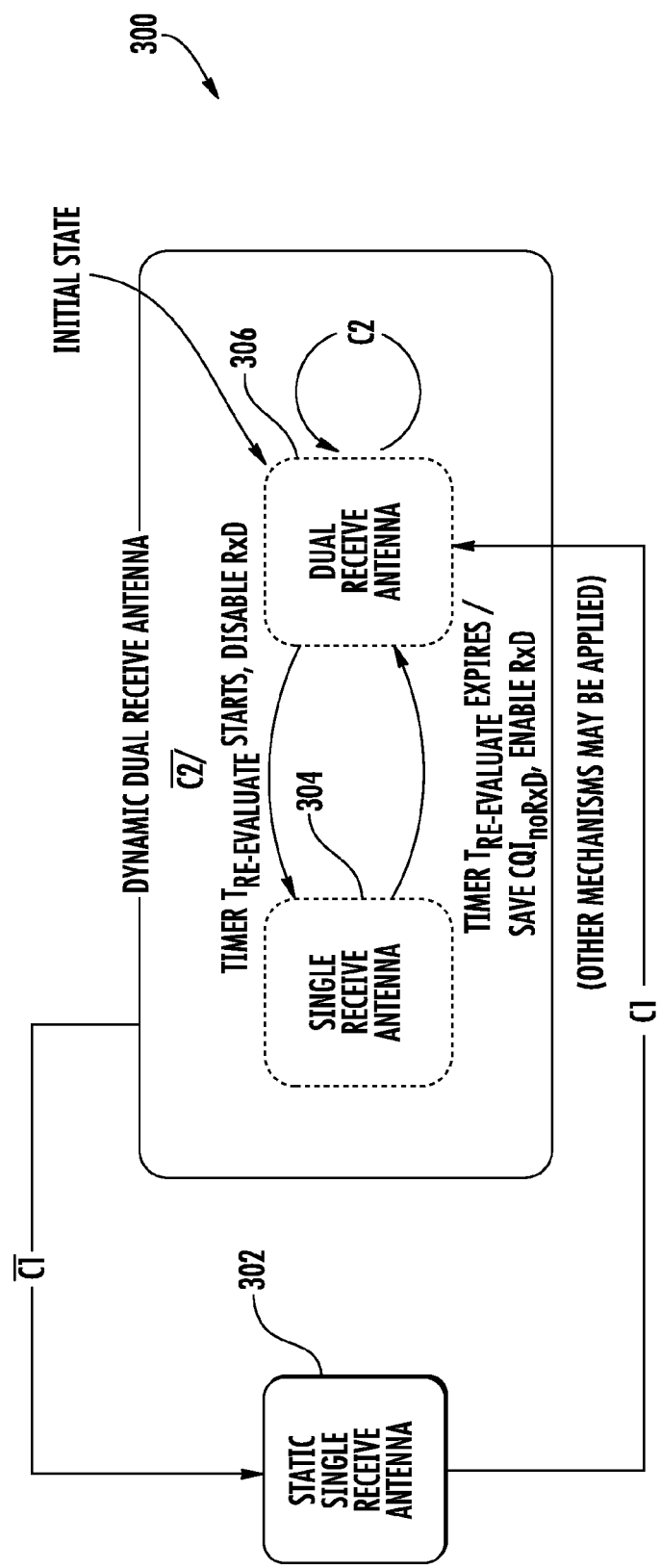
FIG. 3 is a logical state diagram representing one exemplary configuration of a multi-antenna diversity state machine.

Referring now to FIG. 3, in one exemplary embodiment, a UE adaptively adjusts receiver operation during diversity operation. FIG. 3 illustrates one exemplary state machine 300. As shown, the exemplary state machine 300 comprises three (3) states: (i) static single antenna state 302, (ii) dynamic single antenna state 304, and (iii) dynamic dual antenna state 306. It will be appreciated that while the following discussion is cast primarily in the context of a two-antenna system, the various described principles are extensible to systems with any number of resources (e.g., antennas).

The illustrated state machine 300 is configured to transition between the static single antenna state 302 and the dynamic states (304, 306) if either of the following first conditions (C1A, C1B) are true: (i) the Channel Quality Indication (CQI) falls below a CQI threshold value ($CQI_{RXD} < TH_{CQI}$) or (ii) the NodeB scheduled resources (based on the High Speed Shared Control Channel success rate) is equal to or greater than a resource utilization success rate threshold value (scheduled resources $\geq TH_{HS-SCCH}$). Within the dynamic states (304, 306), the mobile device switches between single antenna operation and dual antenna operation, based on a second set conditions. Otherwise, if both of the first conditions are not satisfied, then the mobile device is operating in a high quality channel condition with relatively little utilization and can operate in the static single antenna state.

Figure 3A:
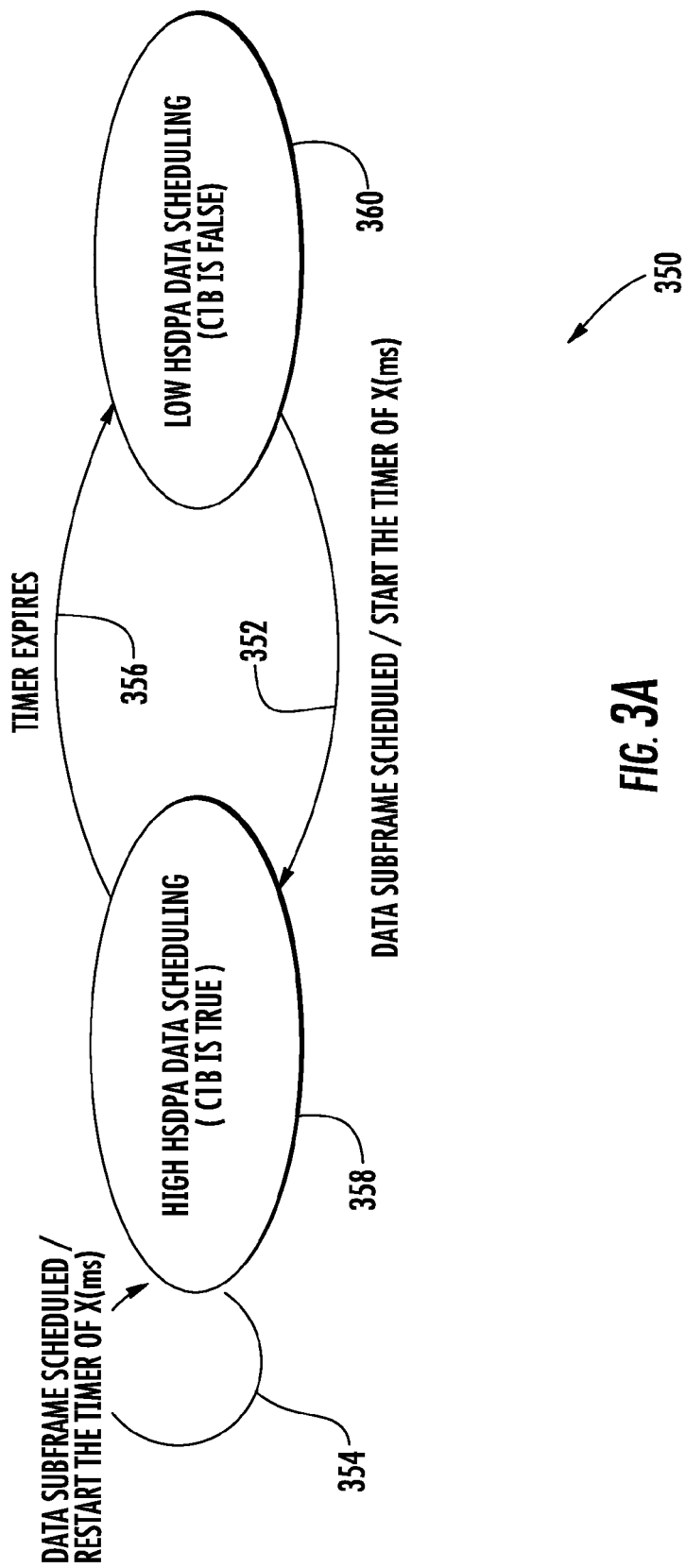
FIG. 3A is a logical state diagram representing one exemplary timer-based High-Speed Downlink Packet Access (HSDPA) traffic detection scheme.

In an alternate embodiment, instead of (or in addition to) basing resource utilization directly on NodeB scheduled resources (e.g., C1B of FIG. 3), the mobile device may infer resource utilization (or detect traffic) based on e.g., recent usage. For example, FIG. 3A illustrates one exemplary timer-based HSDPA traffic detection scheme 350. While the exemplary state diagram of FIG. 3A is configured to evaluate for data scheduling at every transmission time interval (TTI), those of ordinary skill will readily appreciate that alternate embodiments may be generalized for multiple TTIs (e.g., if X data subframes are scheduled over Y TTIs then resource utilization is high), or yet other schemes.

As shown in FIG. 3A, whenever a data subframe is scheduled 352, the mobile device of this embodiment starts an activity timer. If another data subframe is scheduled while the timer is running, the mobile device restarts the timer 354; otherwise, if the timer is allowed to expire 356, the mobile device transitions back to a low resource utilization state. While the timer is running, the mobile device will consider the usage to be high (e.g., High HSDPA (High Speed Downlink Packet Access) data scheduling load (state 358)), and conversely when the timer is not running, the mobile device will consider the usage to be low (e.g., Low HSDPA data scheduling load (state 360)). The result of the HSDPA traffic detection scheme is used in determining whether or not to transition between the static single antenna state 302 and the dynamic states (304, 306); i.e., if the Channel Quality Indication (CQI) falls below a CQI threshold value ($CQI_{RXD} < TH_{CQI}$), or if the HSDPA data scheduling is high, then the mobile device transitions to dynamic operation.

It will be appreciated that the techniques of FIGS. 3 and 3A may, as desired or dictated by the application, be used alone, independently/alternatively, or in concert with one another. For example, in one exemplary scheme, one of the techniques may be used as a "sanity check" for the other, or so as to detect disparities. The two may be selectively applied when more appropriate; e.g., the NodeB-based approach may be used when the NodeB is available and configured to provide the necessary information, and the inferential approach used when such information is not available for whatever reason. Numerous other combinations or schemes for use of one or both of the approaches of FIGS. 3 and 3A will be recognized by those of ordinary skill given the present disclosure.

Referring back to the dynamic single antenna state 304 and the dynamic dual antenna state 306 of FIG. 3, the mobile device will switch or remain in the dynamic dual antenna diversity state 306 if either of the following second conditions (C2A, C2B) are true: (i) there is significant antenna gain ($\Delta CQI > TH_{\Delta CQI}$) or (ii) the minimum CQI for the dynamic single antenna falls below an acceptable threshold ($CQI_{NORXD} < TH_{MINCQI}$). Otherwise, the mobile device can operate within the dynamic single antenna state (i.e., the dynamic dual antenna state is only useful where there is significant antenna gain or where a single antenna has insufficient performance).

Moreover, the state machine dynamically evaluates and transitions between the dynamic states (304, 306) according to a timer. When the timer expires, the state machine re-evaluates the second conditions (C2A, C28) and determines the appropriate state (single antenna or dual antenna).

During the static single antenna state 302, the mobile device does not evaluate the performance difference between diversity and non-diversity operation. In contrast, both of the dynamic single antenna state 304 and dynamic deal antenna state 306 estimate the difference in performance between single antenna and dual antenna operation (C2A). It is of particular note that existing diversity receivers cannot accurately compare performance in distinct diversity modes.

Accordingly, two (2) solutions are presented hereinafter, the appropriate solution being selected on the basis of known (or unknown) spatial correlation between the antennas. Spatial noise correlation is the amount of noise that is correlated over both antennas, and can be characterized as a function of $\rho$ (the ratio of the channel estimate of each antenna: $\rho = h_1/h_2$) and $\beta$ (the spatial correlation of noise: $\beta = E|z_0 z_1^*|$). For clarity, a discussion of spatial correlation for diversity operation has been provided in APPENDIX A hereto, which is incorporated herein by reference in its entirety.

Antenna Gain Comparison with Spatial Noise Correlation

Figure 4:
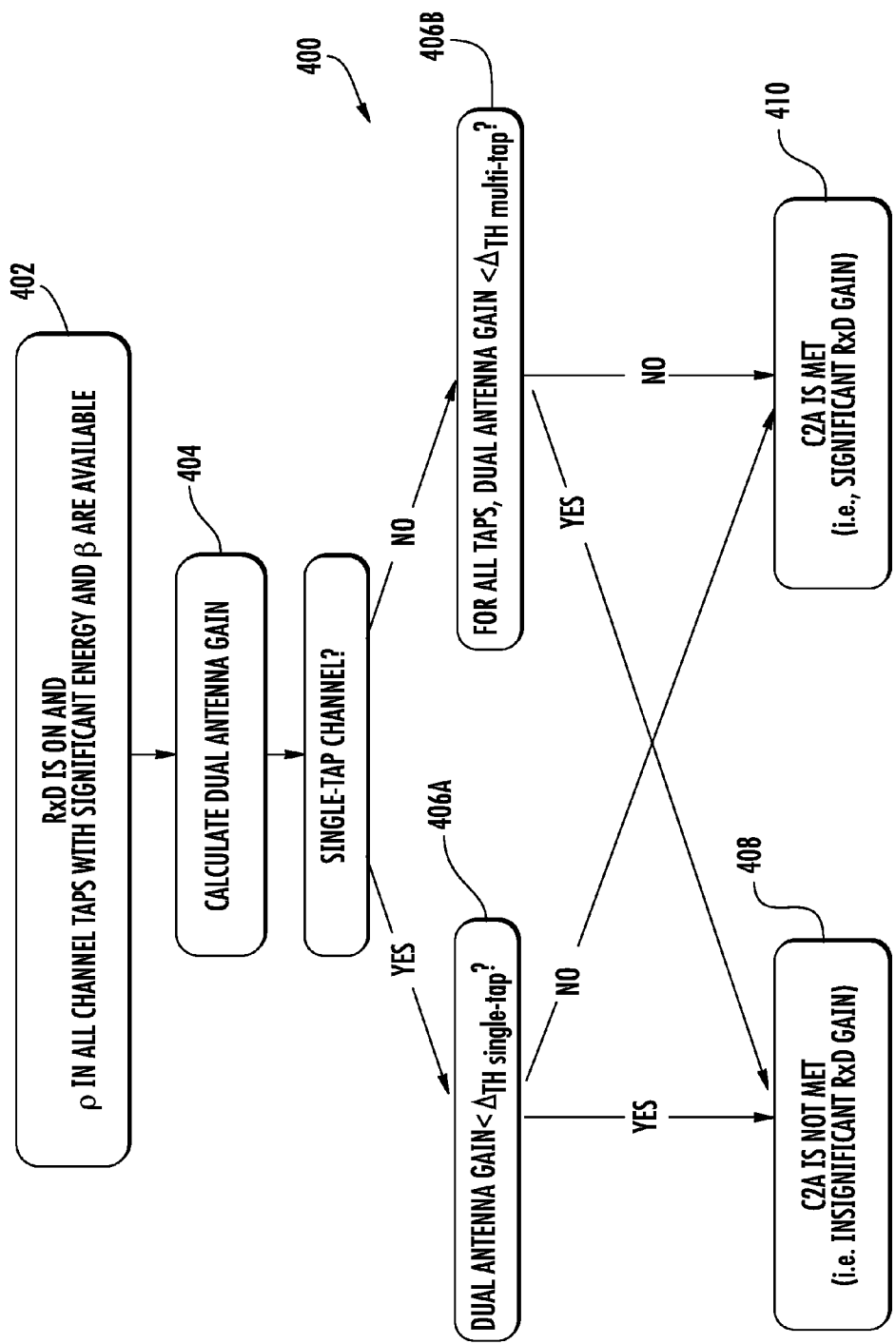
FIG. 4 is a logical flow diagram depicting a first exemplary scheme for comparing antenna gain between a single and a dual antenna configuration when spatial noise correlation between the antennas is known.

FIG. 4 illustrates one exemplary scheme 400 for comparing antenna gain between a single and a dual antenna configuration when spatial noise correlation between the antennas is known.

At step 402, the receiver diversity is enabled, and the corresponding values for $\rho$ and $\beta$ are calculated (i.e., $\rho$ is the ratio of the channel estimate of each antenna: $\rho = h_1/h_2$, and $\beta$ is the spatial correlation of noise: $\beta = E|z_0 z_1^*|$; where $\beta$ may be computed from the correlation matrix of the received signals and the estimated channel matrix. Certain receiver types (e.g., Type 3i) may provide such intermediate elements. At step 404, the receiver gains for dual antenna gain is calculated. For a dual antenna system with n taps, the dual antenna gain is equal to $$1 + \frac{|\rho_n - \beta'|^2}{1 - |\beta|^2},$$

where $\rho_n$ is the ratio of channel estimates for the $n^{th}$ tap.

At step 406A, if the device is operating with a single tap, then the resultant dual antenna gain is compared to a single tap threshold. Alternately if the device is operating with multiple taps, then the resultant dual antenna gain is compared to a multiple tap criterion (e.g., threshold) (step 406B). If the threshold is not met, then the second condition has failed (step 408) i.e., the receiver performance gain from dual antenna configuration is not significant. If the threshold is met or exceeded, then the second condition has passed (step 410). The result of the second condition is fed back to the method of FIG. 3 (step 304).

In some variants, only channel taps with significant energy need to be considered. Certain variations may receive this information based on rake receiver operation (e.g., during operation a rake receiver can indicate a "lock" on one or more fingers). As a general rule of thumb, the diversity gain can be roughly estimated as a factor of 3 dB (i.e., 2× improvement) when comparing single versus dual antenna gains; however implementation specific details may detract from actual experienced performance gains.

Antenna Gain Comparison without Spatial Noise Correlation

Figure 5:
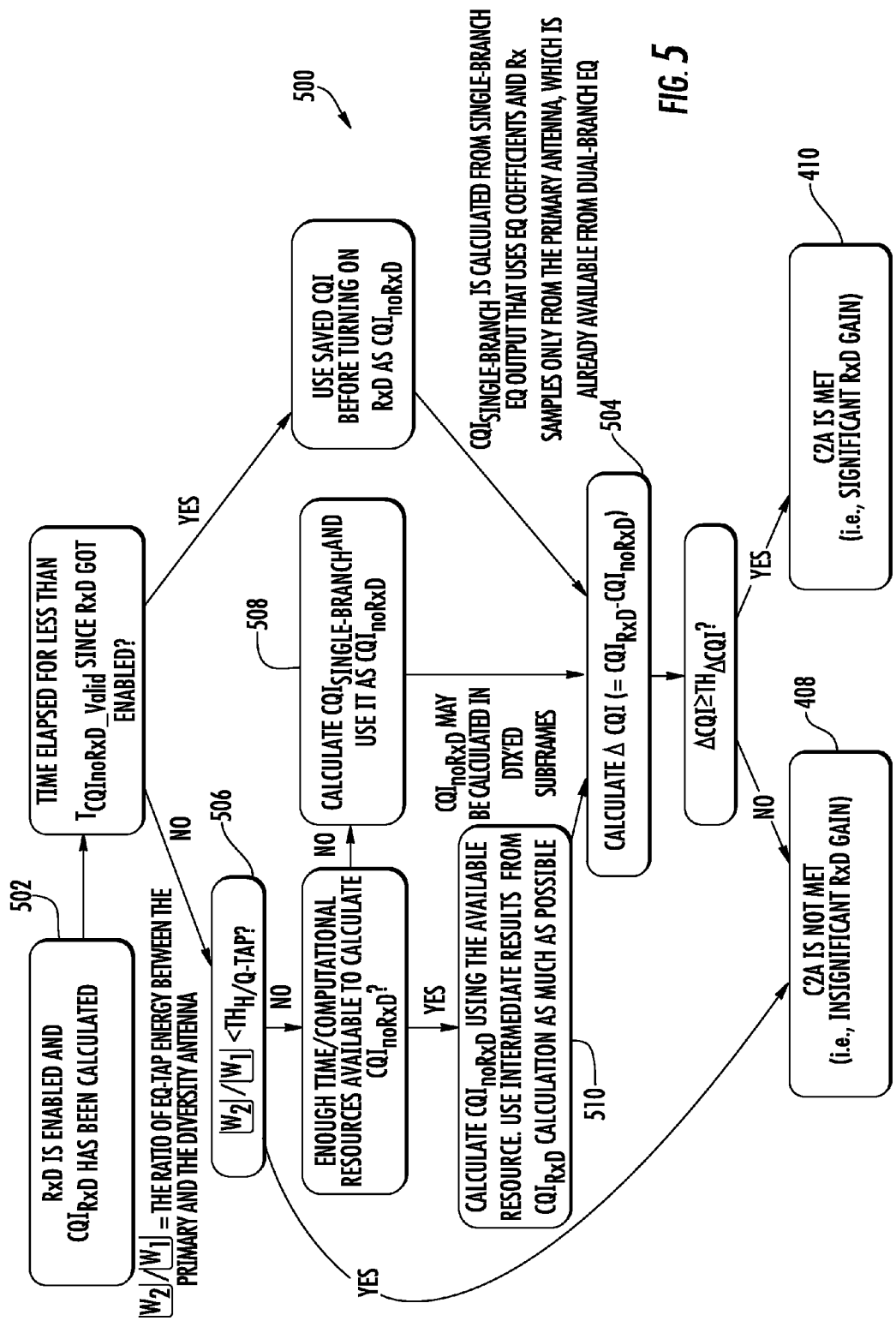
FIGS. 5-7 are logical flow diagrams depicting various exemplary schemes for evaluating antenna gain between different modes (e.g., a single and a dual antenna configuration) under varying spatial noise correlation conditions.

Referring now to FIG. 5 one exemplary scheme 500 for comparing antenna gain between a single and a dual antenna configuration when spatial noise correlation between the antennas is not known, is illustrated.

At step 502 of the method 500, receiver diversity is enabled and CQI ($CQI_{RXD}$) is calculated. Previously calculated values for CQI during dynamic single antenna operation may be valid for a designated time interval ($T_{CQINORXD\_VALID}$). If the CQI value for single antenna operation is still valid, then the process flows to step 504 of the method 500. At step 504, the difference in CQI ($\Delta CQI = CQI_{RXD} - CQI_{NORXD}$) between single antenna and dual antenna is calculated, and the result is fed back to the method of FIG. 3 (step 304).

Alternately, if there is no previously calculated value for CQI based on dynamic single antenna operation (or if the time interval for validity has expired), then the receiver can estimate the performance of dynamic single antenna operation based on the ratio of equalizer tap energy ($|w_2|/|w_1|$) (step 506). Here, $|w_1|$ generally represents the energy of $w_1$ (e.g., also referred to as "L2-norm of $w_1$"). In certain other embodiments, other measurements may be substituted with equal success (e.g., for computational simplicity, the so called "L1-norm" may be used instead). Based on processing capabilities and time, the receiver perform a rough estimation on the CQI of single antenna by computing it only from primary antenna (or another limited set of selected antenna) samples (step 508), or obtain a more accurate estimation given the estimated channel matrix and the intermediate results from CQI of dual antennas ($CQI_{RXD}$) computation (step 510).

Still other variations of the foregoing may be possible. For example, CQI can be calculated based on the last CQI measurement performed in dynamic single antenna operation. In alternate embodiments, the CQI for single antenna operation can be determined during Discontinuous Transmitted (DTX) sub-frames. In still other embodiments, where the channels are slowly fading the receiver can interlace single and dual antenna CQI measurements. In still other embodiments, the processor may be able to recycle existing metrics (e.g., covariance matrix, channel estimates for the primary antenna, etc.) in diversity receiver performance calculations. Still other optimizations may be more complex (e.g., symbol level convolution, rather than chip level convolution, etc.)

Figure 6:
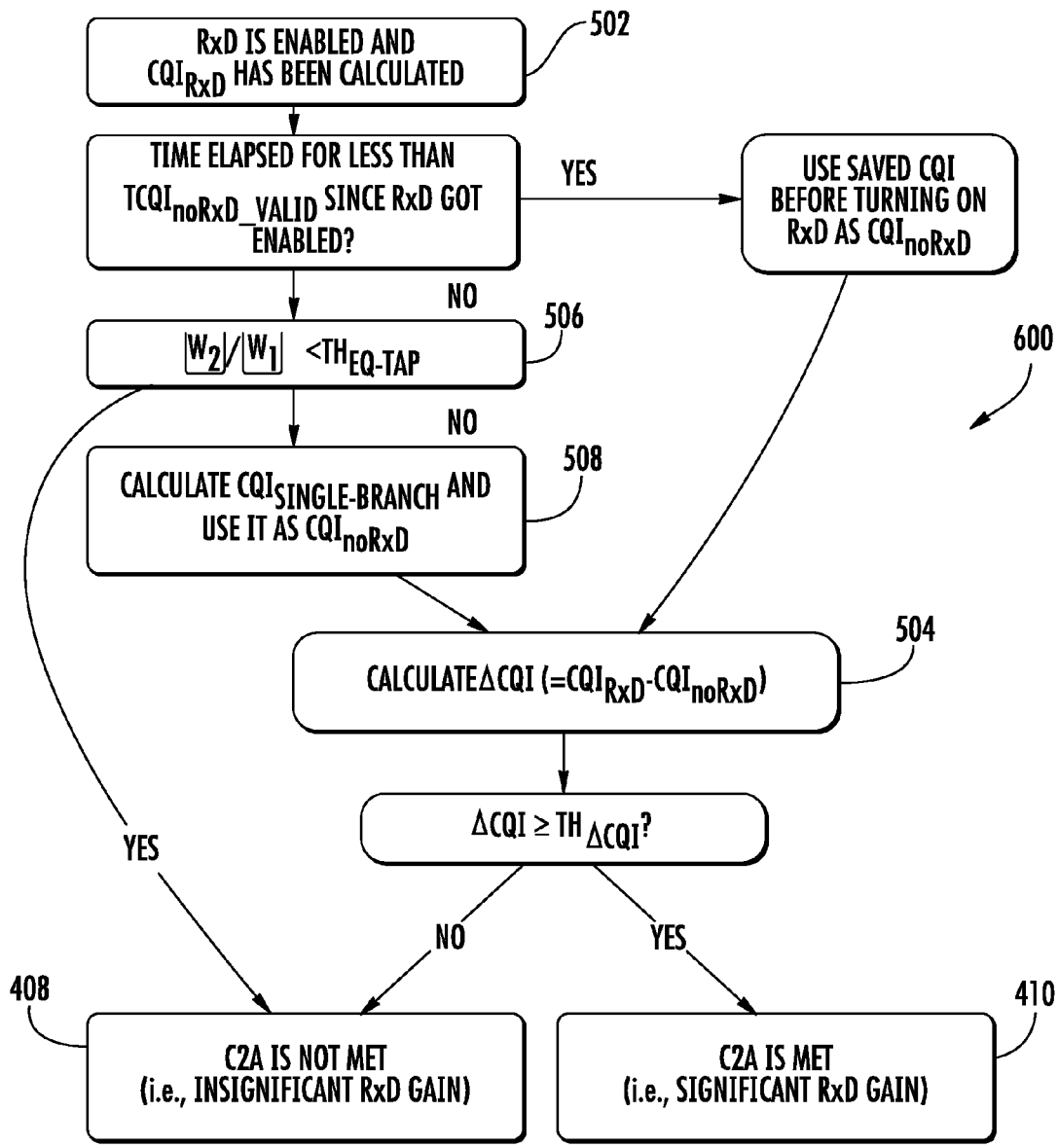

Furthermore, additional levels of simplification may be substituted as well. Referring now to FIG. 6, the receiver omits step 510 and instead calculates the CQI for a single branch (which is a rough approximation of $CQI_{NORXD}$). The CQI for a single branch can be calculated from the equalizer coefficients and the data samples from the primary antenna. The resulting single branch CQI is used to determine the difference in performances and the result is fed back to the method of FIG. 3 (step 304).

Figure 7:
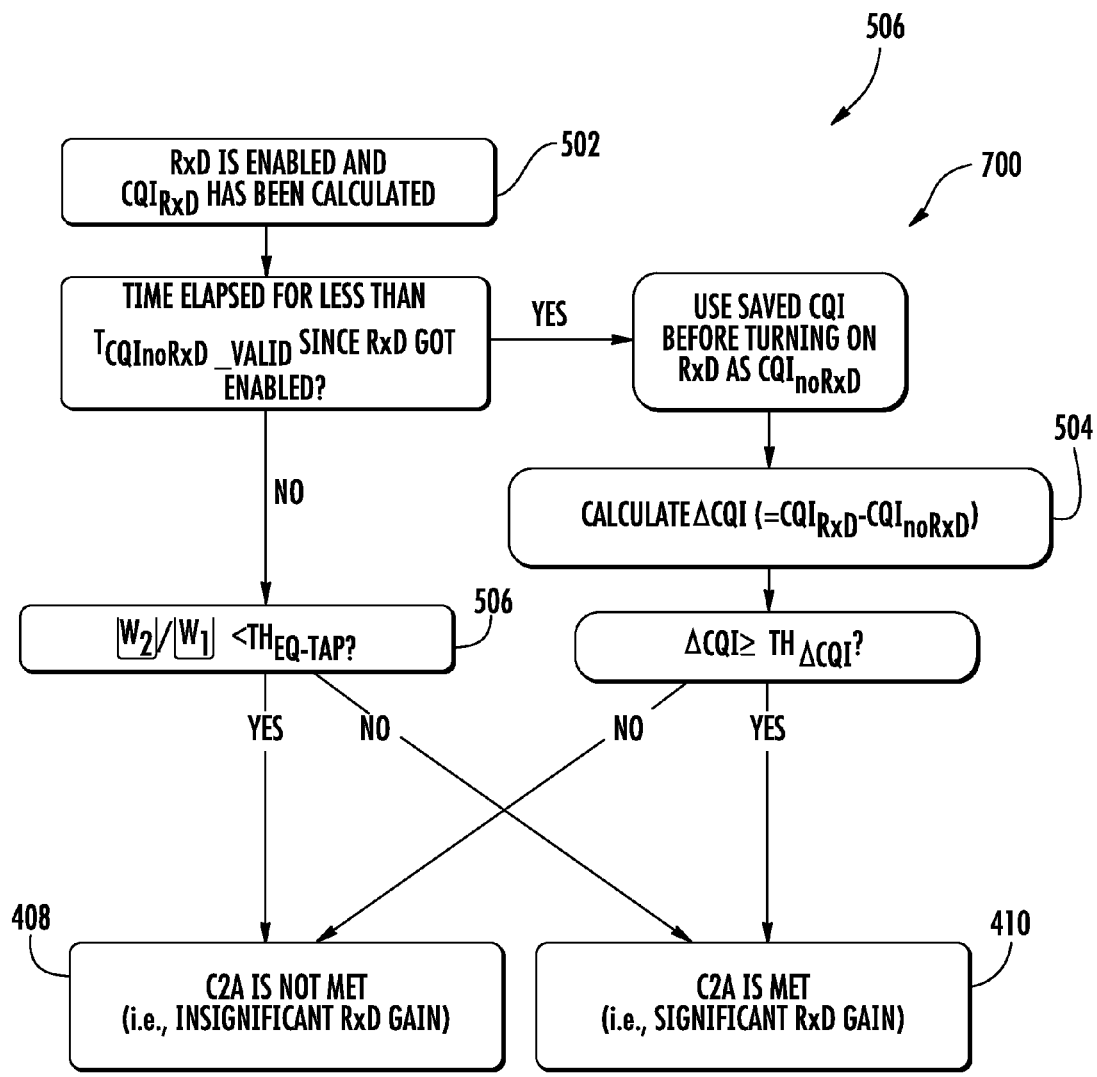

Similarly, the embodiment of FIG. 7 entirely omits the estimation altogether, and deter lines performance gain solely on the basis of the ratio of equalizer tap energy ($|w_2|/|w_1|)/|w_1|$).

Apparatus

Figure 8:
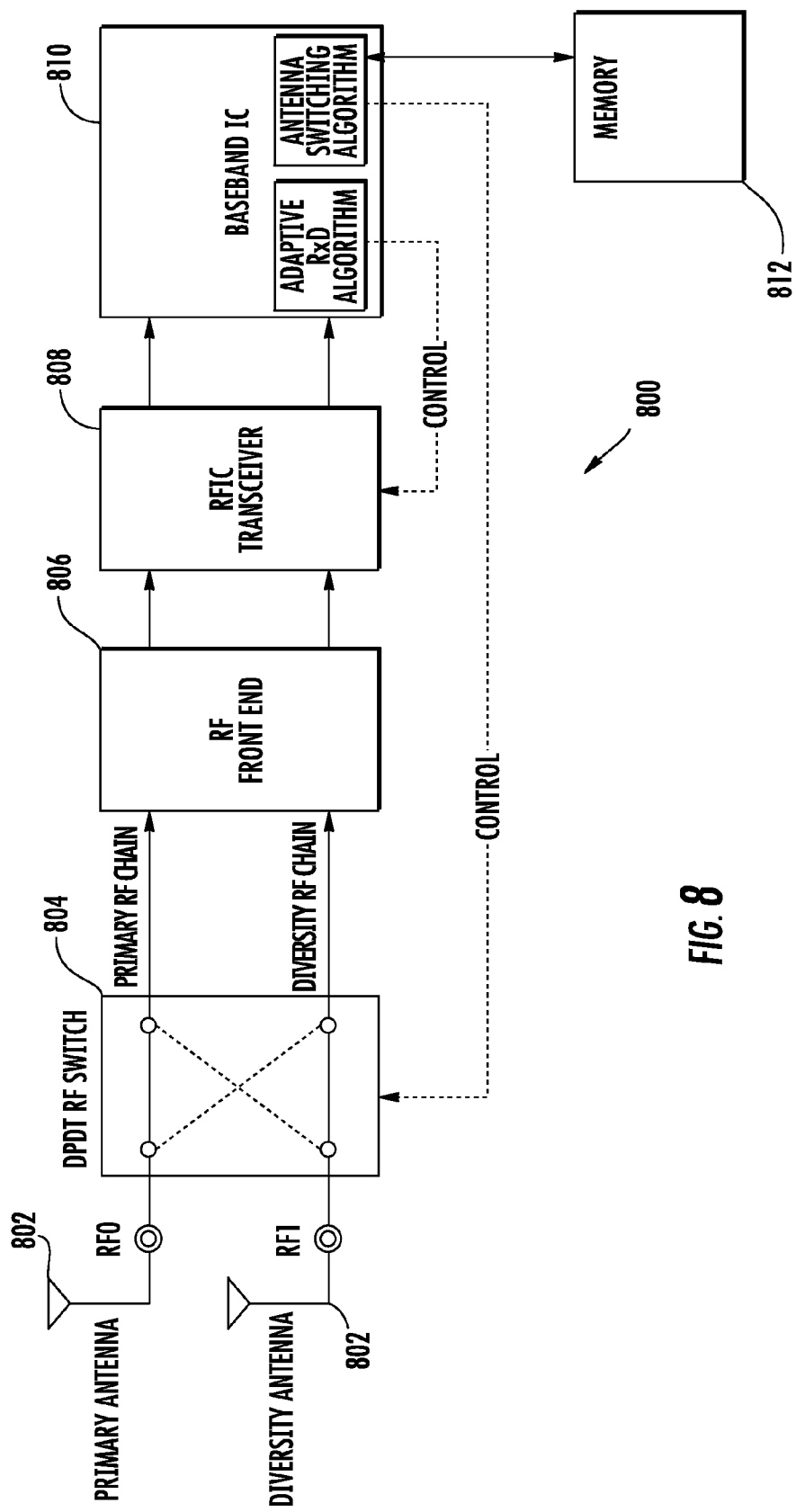
FIG. 8 is a functional block diagram illustrating one embodiment of a mobile wireless user device.

Referring now to FIG. 8, an exemplary user device 800 for adjusting receiver diversity operation based on e.g., diversity performance is illustrated. As used herein, the term "user device" includes, but is not limited to cellular telephones, smartphones (such as for example an iPhone™), wireless-enabled tablet devices (such as for example an iPad™), or any combinations of the foregoing. While one specific device configuration and layout is shown and discussed herein, it is recognized that many other configurations may be readily implemented by one of ordinary skill given the present disclosure, the apparatus 800 of FIG. 8 being merely illustrative of the broader principles described herein.

The apparatus 800 of FIG. 8 includes one or more radio antennas 802, a RF switch 804, a RF front end 806, a transceiver 808, a processor 810 and a computer readable memory 812.

The baseband processing subsystem 810 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 812, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 810 includes discrete components; however, it is understood that in some embodiments they may be consolidated or fashioned in a SoC (system-on-chip) configuration.

The processing subsystem 810 is adapted to receive one or more data streams from the RF assembly (e.g., radio antenna 802, RF switch 804, RF front end 806, and radio transceiver 808). The RF assembly is configured for operation with a wireless standard, such as e.g., the Long Term Evolution (LTE) standard. The RF assembly is furthermore configured for operation via a single antenna, or via a multiple antenna diversity scheme.

Figure 9:
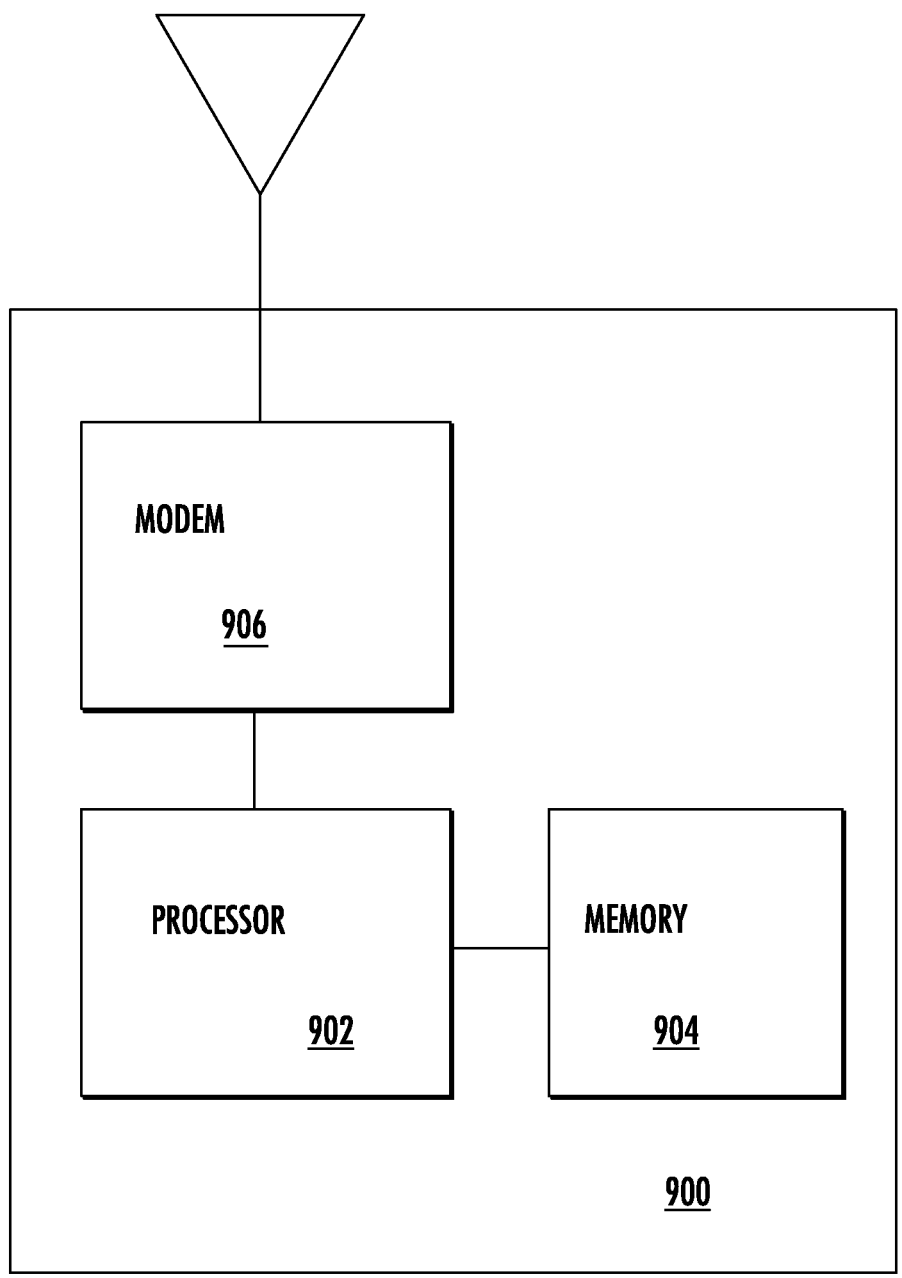
FIG. 9 is a functional block diagram illustrating one embodiment of a network apparatus configured to support adaptive adjustment of wireless receiver operation for a mobile device.

Referring now to FIG. 9, an exemplary network (e.g., base station) apparatus 900 supporting adaptive adjustment of wireless receiver operation for a mobile device is illustrated. As used herein, the term "base station" includes, but is not limited to macrocells, microcells, femtocells, picocells, wireless access points, or any combinations of the foregoing. While a specific device configuration and layout is shown and discussed, it is recognized that many other configurations may be readily implemented by one of ordinary skill given the present disclosure, the apparatus 900 of FIG. 9 being merely illustrative of the broader principles described herein.

The processing subsystem 902 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 904, which may include for example SRAM, FLASH, SDRAM, and/or HDD (Hard Disk Drive) components. The processing subsystem may also include additional co-processors. While the processing subsystem 902 includes discrete components, it is understood that in some embodiments they may be consolidated or fashioned in a SoC (system-on-chip) configuration.

The apparatus 900 further includes one or more wireless interfaces 906 which are configured to receive/send transmissions from/to mobile devices (including connection request responses). In one exemplary embodiment, the wireless interface includes a Long Term Evolution (LTE) transceiver, comprising one or more antennas and a baseband processor.

Myriad other schemes for adaptively adjusting receiver operation during discontinuous reception will be recognized by those of ordinary skill given the present disclosure.

It will be recognized that while certain embodiments are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features as applied to various embodiments, it will be understood that various omissions, substitutions, and changes in the form and details of the device or process illustrated may be made by those skilled in the art without departing from the disclosed principles. The foregoing description is of the best mode presently contemplated. This description is in no way meant to be limiting, but rather should be taken as illustrative of the general principles. The scope of the present disclosure should be determined with reference to the claims.

APPENDIX A

©Copyright 2012-2013 Apple Inc. All rights reserved.

Certain nomenclatures and expressions are used when describing antenna diversity. Specifically, as described in EQN. 1, the received signal ($y_n$) is equal to the channel matrix (H) multiplied by the input signal ($x_n$) with additive noise ($z_n$).

$$\bar{y}_n = H\bar{x}_n + \bar{z}_n \quad \text{EQN. 1}$$

Consider a system with two (2) antennas. The form of the channel matrix H for a channel with $L_k$ taps and two antennas is:

$$RxD\_Gain = \frac{SNR_{Dual\_ANT}}{SNR_{Single\_ANT}}$$

$$H = \begin{bmatrix} h_{0,0} & h_{1,0} & \cdots & h_{l_1-1,0} & 0 & 0 & 0 \\ h_{0,1} & h_{1,1} & \cdots & h_{l_1-1,1} & 0 & 0 & 0 \\ 0 & h_{0,0} & h_{1,0} & \cdots & h_{l_1-1,0} & 0 & 0 \\ 0 & h_{0,1} & h_{1,1} & \cdots & h_{l_1-1,1} & 0 & 0 \\ \vdots & \ddots & \ddots & \ddots & \ddots & \ddots & \vdots \\ 0 & \cdots & 0 & h_{0,0} & h_{1,0} & \cdots & h_{l_1-1,0} \\ 0 & \cdots & 0 & h_{0,1} & h_{1,1} & \cdots & h_{l_1-1,1} \end{bmatrix} 2*N_{EQ}$$

$$L_1 + N_{I,Q} - 1$$

Moreover, if the input signals are normalized (i.e., $E|X_i|^2=1$) and $_n$ has been scaled such that the additive noise is also normalized (i.e., $E|Z_i|^2=1$) and there is no temporal correlation, then the spatial noise correlation ($\beta$) of the two antennas can be further expressed according to EQN. 2.

$$\beta = E[Z_0 Z_1^*] \quad \text{EQN. 2}$$

Within this framework, the unbiased Minimum Mean Squared Error (MMSE) estimate and Signal to Noise Ratio (SNR) for the diversity paths can be expressed according to EQN. 3, EQN. 4, EQN. 5:

$$SNR_{unbiased} = \frac{w_\Delta^* H_{\Delta+1}}{1 - w_\Delta^* H_{\Delta+1}} \quad \text{EQN. 3}$$

$$\tilde{x}_{n-\Delta} = \frac{w_\Delta^*}{w_\Delta^* H_{\Delta+1}} \bar{y}_n \quad \text{EQN. 4}$$

$$w_\Delta^* = H_{\Delta+1}^* (HH^* + R_{ZZ})^{-1} \quad \text{EQN. 5}$$

Where $\Delta$ represents the equalizer delay (which is 0 for a single tap channel), and $H_{\Delta+1}$ is the $(\Delta+1)^{th}$ column vector of the channel matrix H.

The processing gain attributable to receiver diversity can be expressed according to EQN. 6:

$$= \frac{w_{\Delta,Dual\_ANT}^* H_{\Delta-1,Dual\_ANT} /}{w_{\Delta,Single\_ANT}^* H_{\Delta-1,Single\_ANT} /} \cdot \frac{(1 - w_{\Delta,Dual\_ANT}^* H_{\Delta+1,Dual\_ANT})}{(1 - w_{\Delta,Single\_ANT}^* H_{\Delta-1,Single\_ANT})} \quad \text{EQN. 6}$$

For receivers that only implement a single tap (i.e., $\Delta=0$), this can be further simplified to:

$$\frac{SNR_{Dual\_ANT}}{SNR_{Single\_ANT}} = 1 + \frac{|\rho - \beta^*|^2}{1 - |\beta|^2} \quad \text{EQN. 7}$$

What is claimed is:

1. A method for adaptively adjusting wireless receiver operation during diversity operation, the method comprising:
   selecting static operation or dynamic diversity operation based on at least: (i) a channel quality, and (ii) a resource allocation, wherein the dynamic diversity operation is selected when the resource allocation is greater than a utilization threshold level; and
   when dynamic diversity operation is selected:
      estimating performance of a plurality of diversity configurations and one or more corresponding power consumptions;
      comparing the performance and corresponding one or more power consumptions of the plurality of diversity configurations; and
      selecting a diversity configuration based on the comparison.

2. The method of claim 1, wherein the channel quality consists of at least one of: (i) a Channel Quality Indication (CQI), (ii) a Signal-to-Noise Ratio (SNR), and (iii) a Received Signal Strength Indication (RSSI).

3. The method of claim 1, wherein the static operation is selected when the channel quality is above a reception threshold level and the resource allocation is below the utilization threshold level;
   wherein the static operation comprises a single antenna scheme.

4. The method of claim 1, wherein the dynamic diversity operation is selected when the channel quality is above a reception threshold level.

5. The method of claim 1, wherein a maximal diversity scheme is selected when the channel quality is below a reception threshold level and the resource allocation is above the utilization threshold level.

6. The method of claim 1, wherein the estimating the performance further comprises calculating one or more performance metrics of a non-diversity operation and the one or more diversity configurations.

7. The method of claim 1, wherein the one or more power consumptions are directly measured during an operation of the corresponding one or more diversity configurations and subsequently stored.

8. The method of claim 1, wherein the performance is estimated using one or more of:
(i) a bit error rate (BER), (ii) a block error rate (BLER), and (iii) a packet error rate (PER).

9. The method of claim 1, wherein the performance is estimated based on one or more intermediate calculations selected from at least one of: (i) a covariance matrix, (ii) a rake processing, and (iii) a diversity weighting ratio.

10. Mobile apparatus configured to implement dynamic receiver diversity operation, the mobile apparatus comprising:
a wireless receiver configured to support both single antenna and diversity antenna reception;
a processor in signal communication with the wireless receiver; and
computerized logic in signal communication with the processor and the wireless receiver, the logic configured to:
determine when static operation or dynamic diversity operation is necessary based on, at least, (i) a channel quality and (ii) a resource allocation, wherein the dynamic diversity operation is selected when the resource allocation is greater than a utilization threshold level; and
when dynamic diversity operation is necessary:
determine a performance of a plurality of diversity configurations and one or more corresponding power consumption attributes; and
select a diversity configuration of the plurality of diversity configuration based at least on the foregoing determinations.

11. The mobile apparatus of claim 10, wherein the one or more pre-determined conditions comprises at least a Channel Quality Indication (CQI) and a NodeB scheduling ratio.

12. The mobile apparatus of claim 10, wherein the determination of static operation or dynamic diversity operation necessity comprises a link evaluation performed on a periodic basis.

13. The mobile apparatus of claim 10, wherein the determination of static operation or dynamic diversity operation necessity comprises a link evaluation triggered by an event.

14. The mobile apparatus of claim 10, wherein the selection of the diversity configuration is further based at least in part on a comparison between one or more power consumptions associated with the one or more diversity configurations.

15. A mobile device configured to establish a connection to a target apparatus in a wireless network, the mobile device comprising:

a wireless transceiver, the wireless transceiver configured to:
transition between a static single antenna state and a dynamic state based on at least: (i) a Channel Quality Indication (CQI) value and (ii) a scheduled resources value, wherein the dynamic state is selected when the scheduled resources value is greater than a utilization threshold level; and
transition between a dynamic single antenna state and a dynamic dual antenna state based on one or more of: (i) an antenna gain value, and/or (ii) the CQI value associated with the dynamic single antenna state; and
a processor; and
a non-transitory computer-readable storage comprising a plurality of instructions, the plurality of instructions configured to, when executed by the processor, cause the mobile device to:
reevaluate a need for the transition between the dynamic single antenna state and the dynamic dual antenna state when a predetermined amount of time has lapsed;
estimate a difference in performance between the dynamic single antenna state and a plurality of dynamic multiple antenna states.

16. The method of claim 1, wherein the resource allocation is based on a scheduled data transfer.

17. The method of claim 1, wherein each of the plurality of diversity configurations comprise utilization of a different amount of communication channels.

18. A method of operating a mobile device capable of switching between a diversity and non-diversity states of operation, the method comprising:
calculating a performance gain based on a known spatial noise correlation between a plurality of antennas of the mobile device, the calculating contingent upon the mobile device switching to the diversity state;
comparing the performance gain with a predetermined reception threshold;
comparing a scheduled resources value to a utilization threshold;
when it is determined from the act of comparing that the performance gain exceeds the predetermined reception threshold and the scheduled resources values exceeds the utilization threshold, entering one of a plurality of multiple antenna modes; and
when it is determined from the act of comparing that the performance gain does not exceed a tap threshold, entering a single antenna mode.

19. The method of claim 18, wherein the predetermined reception threshold comprises a multiple tap criterion.

* * * * *